Feb. 7, 1933.　　　　J. GRAU　　　　1,896,194
VEHICLE HEADLIGHT
Filed July 13, 1931
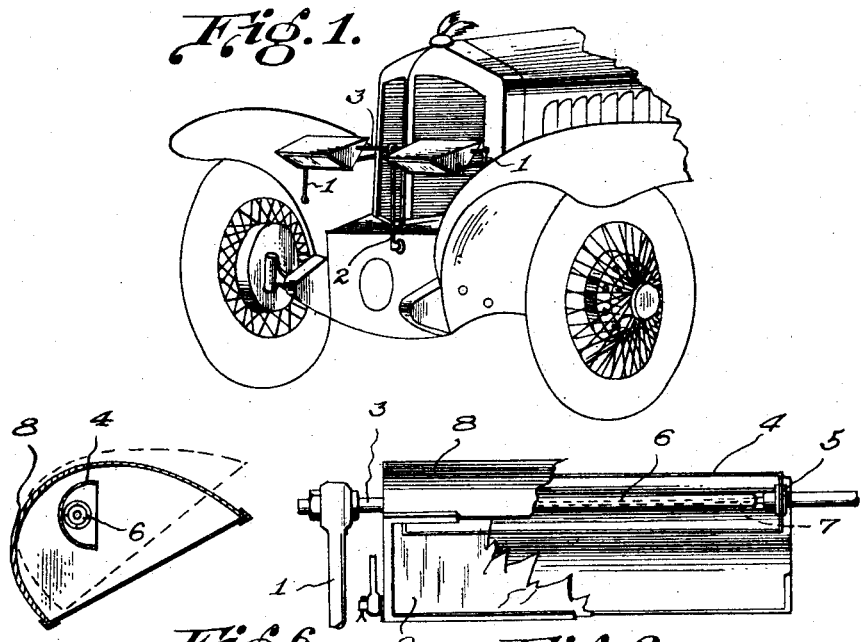
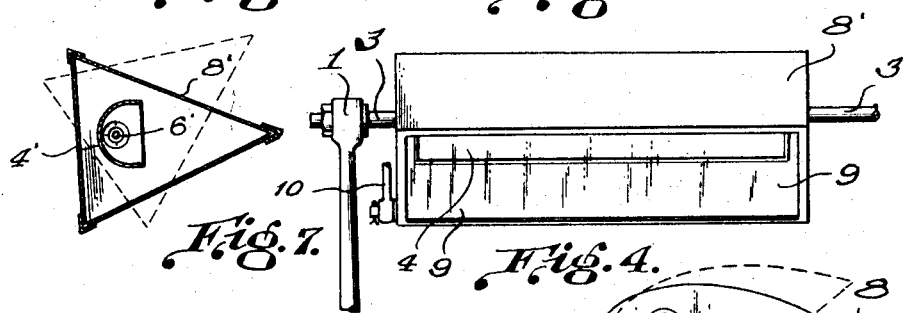
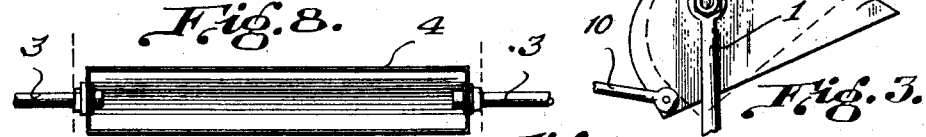
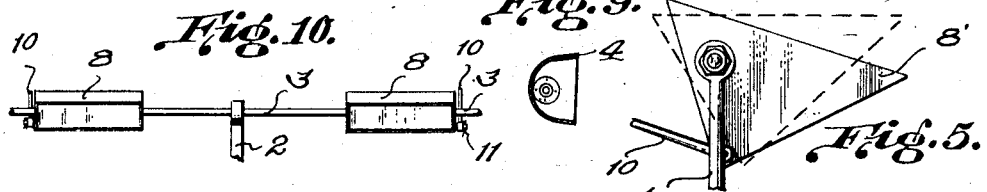
INVENTOR.
Juan Grau
BY: Marks & Clerk
ATTORNEYS.

Patented Feb. 7, 1933

1,896,194

UNITED STATES PATENT OFFICE

JUAN GRAU, OF HABANA, CUBA

VEHICLE HEADLIGHT

Application filed July 13, 1931. Serial No. 550,601.

This invention has reference generally to that class of invention known as illumination and more particularly relates to an improved headlight for motor vehicles.

The invention as its primary aim and object contemplates the provision of an improved headlight for application on automobiles or other vehicles for the purpose of avoiding the sudden temporary blinding which is produced during the approaching of two or more vehicles driving in opposite directions over a highway.

More particularly the invention embraces the provision of an improved headlight embodying an elongated small diametered lamp which is adapted to be arranged approximately close to the ground and horizontally of the reflector, while rotatable about the horizontal axis of the lamp and coacting therewith is an improved shielding casing, the front end of which is adapted to be positioned in substantially the same horizontal plane as the above to prevent the light rays from being directed in an upward direction or above the longitudinal axis of the lamp.

Other objects, as well as the nature, characteristic features and scope of the invention will be more readily apparent from the following description taken in connection with the accompanying drawing and pointed out in the claim.

The invention is clearly illustrated in the accompanying drawing in which,—

Figure 1 is a fragmentary perspective view of the front end of the automobile showing one form of the improved headlight applied thereto;

Figure 2 is a front elevational detail of a slightly modified form with the shielding casing partly broken away;

Figure 3 is an end elevational detail of the arrangement shown in Figure 2;

Figure 4 is an enlarged front elevational detail of the type of headlight shown in Fig. 1;

Figure 5 is an end elevational detail thereof;

Figure 6 is a transverse sectional view through the arrangement shown in Figure 2;

Figure 7 is a transverse sectional view through the arrangement shown in Figure 4;

Figure 8 is an enlarged front elevational detail of the reflector;

Figure 9 is a transverse sectional view through the reflector shown in Figure 8;

Figure 10 is a fragmentary front elevational view showing the supporting means for a pair of the headlights of the type shown in Figure 2; and Figure 11 is an elevational detail of the improved lamp.

Similar characters of reference are employed in the above described views to indicate corresponding parts.

Referring now more particularly to the accompanying drawing there is provided suitable supporting means in the form of brackets 1 and 2 the former being placed on the front mud guards and the latter to the frame at a point so that it will be positioned substantially medially of the radiator, while journalled in the upper ends of the brackets is a horizontal sectional shaft 3. Between the intermediate and end sections of each shaft are fitted parabolic reflectors 4 the same being clamped so that the outer edges are arranged in a vertical plane, suitable clamping means being shown at 5 in the form of collars. Improved electric lamps 6 are now provided, the bulbs or casings of the same being of the cylindrical shape and of a narrow diameter and of a length just short of the length of the reflectors. The ends of the improved bulbs are operatively mounted in sockets in the ends of the reflectors 4 and in alignment with the sections of the shaft 3 and preferably these bulbs are also positioned at the optical axis of the reflectors 4 so that the rays are directed forwardly and parallel to the ground. The filaments consist of longitudinal wires 7 shown in dotted lines in Figure 2 and extend in parallelism and centrally of the bulbs 6 from one end to the other. This improved arrangement produces a horizontal luminous light in contradistinction to a luminous center of the usual pear-shaped lamp bulb.

Coacting with the improved bulbs and the reflectors are the improved shielding casings 8, 8'. These casings are preferably formed of metal, substantially semicylindrical in cross section as at 8 or triangular in cross section as at 8'. A light transmitting plate 9 is mounted at the front of each of said casings to act as a closure therefor. The ends of the casings are rotatably arranged about the sections of the shaft 3 close to the ends of the reflectors 4.

Suitable operating mechanism is employed to maintain the shielding casings in the desired position of adjustment and in this instant include longitudinally adjustable rods 10, the outer ends of which are pivoted as at 11 to the outer sides of the casings as shown particularly in Figure 10. It is preferred that these rods be operated simultaneously and that the upper open edge of each shield casing be positioned in a plane substantially parallel with the horizontal plane of the axis of the bulb 6 with the purpose of intercepting the upper rays thereby preventing any possibility of the same interfering with the eyesight of the driver of an approaching vehicle. In this case however it is of great importance to place the reflector as near to the ground as possible so that all of the rays from the light can be utilized. In this instance the shielding casings 8, 8' can be positioned as shown in dotted lines in the drawings. At any rate the arrangement is such that the illumination field can be increased or reduced at any time by the driver of the vehicle.

It is believed that in view of the foregoing description that a further and detailed description of the operation of the invention is entirely unnecessary. Likewise it is believed that the advantages of the invention will be readily apparent.

Having thus fully described the invention what is claimed as new and desired to be secured by Letters Patent is:

A headlight for motor vehicles including in combination a fixed horizontal supporting shaft situated in front of the vehicle and in close relation to the ground composed of three sections, elongated cylindro-parabolic reflectors interposed in said sections and fixed thereto, elongated cylindrical lamp bulbs mounted in the reflectors at the optical axis thereof and extending entirely across the reflectors and in alignment with the shaft sections, shielding casings rockably mounted on the shaft and housing the reflectors and bulbs and having forwardly and upwardly inclined open front faces with the upper portions serving as a means for intercepting the light rays, light transmitting cover plates at the front faces of the casings for completely closing the same, and manually operable means for tilting the casings about the shaft as an axis.

In testimony whereof I affixed my signature.

JUAN GRAU.